United States Patent [19]

Schon et al.

[11] Patent Number: 4,944,855
[45] Date of Patent: Jul. 31, 1990

[54] AQUEOUS ELECTROCOATING BATHS FOR CATHODIC PLANT DEPOSITION AND PROCESSES FOR THEIR PREPARATION

[75] Inventors: Georg Schon, Everswinkel; Gunter Ott; Michael Geist, both of Munster, all of Fed. Rep. of Germany

[73] Assignee: BASF Lacke + Farben Aktiengesellschaft, Munster, Fed. Rep. of Germany

[21] Appl. No.: 275,085

[22] PCT Filed: Mar. 7, 1987

[86] PCT No.: PCT/EP87/00130
§ 371 Date: Sep. 23, 1988
§ 102(e) Date: Sep. 23, 1988

[87] PCT Pub. No.: WO87/05922
PCT Pub. Date: Oct. 8, 1987

[30] Foreign Application Priority Data

Mar. 26, 1986 [DE] Fed. Rep. of Germany ....... 3610183

[51] Int. Cl.$^5$ .................... C08L 63/00; C25D 13/06
[52] U.S. Cl. ................................ 204/181.7; 523/404; 523/414
[58] Field of Search ............... 204/181.7; 523/404, 523/414

[56] References Cited

U.S. PATENT DOCUMENTS

| | | | |
|---|---|---|---|
| 4,476,263 | 10/1984 | Owens | 523/426 |
| 4,624,975 | 11/1986 | Pham | 523/453 |
| 4,698,141 | 10/1987 | Anderson | 204/181.7 |
| 4,707,232 | 11/1987 | Batzill | 204/181.7 |

FOREIGN PATENT DOCUMENTS 0074634 3/1983 European Pat. Off. .
8600627 1/1986 World Int. Prop. O. .

Primary Examiner—John F. Niebling
Assistant Examiner—Ben C. Hsing
Attorney, Agent, or Firm—Kenyon & Kenyon

[57] ABSTRACT

The invention relates to aqueous electrocoating baths for cathodic paint deposition which contain, as cathodically depositable binders, modified epoxide-amine adducts and are prepared by reacting, in the presence of basic amine catalysts, (1)
 (A) polyepoxides with
 (B) compounds which contain, per molecule, one or more, preferably 2, hydroxyl groups bonded to aromatic and/or (cyclo)aliphatic molecular fragments, to form epoxide group-containing intermediates, and (2) by subsequently reacting these intermediates, if appropriate, with further conventional modifiers and finally with
 (C) primary and/or secondary (poly)amines or their salts and/or salts of tertiary amines, the resultant reaction products being neutralized with acids, if appropriate, dispersed in an aqueous medium and these dispersions further processed by well-known methods to form electrocoating baths. The electrocoating baths according to the invention are distinguished by the fact that the basic amine catalyst which catalyzes the reaction between the components (A) and (B) is neutralized, prior to further reaction of the intermediates formed from the components (A) and (B), with a Brönsted acid having a $pK_s$ value of the first stage of dissociation, measured at 20° C., below 3.7, preferably below 3.5.

8 Claims, No Drawings

AQUEOUS ELECTROCOATING BATHS FOR CATHODIC PLANT DEPOSITION AND PROCESSES FOR THEIR PREPARATION

The invention relates to aqueous electrocoating baths for cathodic paint deposition which contain, as cathodically depositable binders, modified epoxide-amine adducts and are prepared by reacting, in the presence of basic amine catalysts, (1)
- (A) polyepoxides with
- (B) compounds which contain, per molecule, one or more, preferably 2, hydroxyl groups bonded to aromatic and/or (cyclo)aliphatic molecular fragments, to form epoxide group-containing intermediates, and (2) by subsequently reacting these intermediates, if appropriate, with further conventional modifiers and finally with
- (C) primary and/or secondary (poly)amines or their salts and/or salts of tertiary amines, the resultant reaction products being neutralized with acids, if appropriate, dispersed in an aqueous medium and these dispersions further processesd by well-known methods to form electrocoating baths.

Cathodic paint deposition is a painting method frequently employed particularly for priming, in which water-dilutable synthetic resins carrying cationic groups are deposited on electrically conducting bodies by direct current.

Electrocoating baths of the type described above are disclosed, for example, in the following patent documents U.S. Pat. No. 3,799,854, U.S. Pat. No. 3,984,299, U.S. Pat. No. 4,031,050, U.S. Pat. No. 4,252,703, U.S. Pat. No. 4,332,711 and in German Patent No. 3,108,073.

It is known that paint coatings of excellent quality can be obtained by using paint systems of this type.

The electrocoating baths under discussion unfortunately also contain chloride ions which cause corrosion of the electrocoating plant, in particular of the anodes (for example pitting corrosion of stainless steel electrodes), when the concentration of these ions exceeds a limit that depends on several parameters (for example the pH of the electrocoating bath).

The interfering chloride ions originate mainly from the polyepoxides used as component (A) in the synthesis of the binders and contaminated with chlorine-containing byproducts.

These byproducts can contain, for example, the following structural elements:

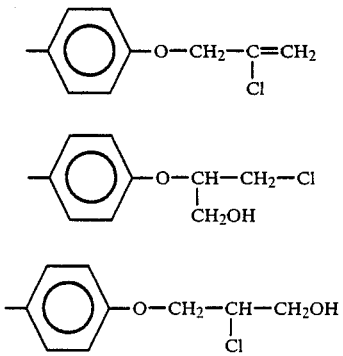

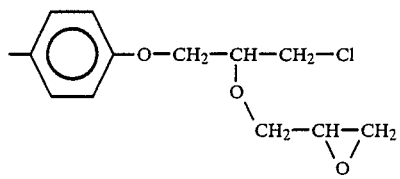

Because of the presence of such byproducts, the chlorine content of commercial polyepoxides is between 0.15 and 0.5%.

German Auslegeschrift No. 2,751,498 states that the addition of nitrate and/or nitrite ions to the electrocoating bath results in a reduction of the corrosion damage due to the presence of chloride ions.

This process as well as purification of the polyepoxides contaminated with chlorine-containing byproducts or removal of the chloride ions from the ready-to-use aqueous electrocoating paint by means of known methods of separation are not carried out in practice because of economic and/or technical difficulties.

The object forming the basis of the present invention consists in preparing electrocoating baths of the type described which have chloride ion concentrations lower than the baths known in the current state of the art.

Surprisingly, this object can be achieved by preparing electrocoating baths of the type described above, wherein the basic amine catalyst which catalyzes the reaction between the components (A) and () is neutralized, prior to further reaction of the intermediates formed from the components (A) and (B), with a Bronsted acid having a $pK_s$ value of the first stage of dissociation, measured at 20° C., of below 3.7, preferably below 3.5

The invention also relates to a process for the preparation of aqueous electrocoating baths for cathodic paint deposition, in which (1)
- (A) polyepoxides are reacted, in the presence of basic amine catalysts, with
- (B) compounds which contain, per molecule, one or more, preferably 2, hydroxyl groups bonded to aromatic and/or (cyclo)aliphatic molecular fragments, to form epoxide group-containing intermediates, and (2) these intermediates are subsequently reacted, if appropriate, with further conventional modifiers and finally with
- (C) primary and/or secondary (poly)amines or their salts and/or salts of tertiary amines, the resultant reaction products are neutralized with acids, if appropriate, dispersed in an aqueous medium and these dispersions are further processed by well-known methods to form electrocoating baths, wherein the basic amine catalyst which catalyzes the reaction between the components (A) and (B) is neutralized, prior to further reaction of the intermediates formed from the components (A) and (B), with a Bronosted acid having a $pK_s$ value of the first stage of dissociation, measured at 20° C., of below 3.7, preferably below 3.5.

For the preparation of the electrocoating baths according to the invention, the cathodically depositable binder is synthesized by well-known methods in a reaction medium consisting predominantly of organic solvents.

To this end, epoxide group-containing intermediates are first of all prepared from the components (A) and (B) in the presence of a basic amine catalyst.

All compounds whose molecule contains on average more than 1 epoxide group can be used as the component (A). Those compounds which contain 2 epoxide groups per molecule and have a relatively low molecular weight of not more than 750, preferably 400-500, are preferred.

Polyglycidyl ethers of polyphenols prepared from polyphenols and epihalohydrins are particularly preferred epoxide compounds. Bisphenol A can be preferably used as the polyphenol.

Polyglycidyl esters of polycarboxylic acids can also be employed. Glycidyl adipate and glycidyl phthalate are typical examples.

In addition, hydantoin epoxides, epoxidized polybutadiene and polyepoxide compounds obtainable by epoxidizing an olefinically unsaturated alicyclic compound are suitable.

Compounds which contain, per molecule, one or more, preferably 2, hydroxyl groups bonded to aromatic and/or (cyclo)aliphatic molecular fragments are used as component (B).

Compounds which are suitable as component (B) include both low-molecular and high-molecular compounds.

Suitable low-molecular components (B) consist of phenolic, aliphatic and/or alicyclic polyhydric alcohols of a molecular weight below 350.

The following are examples of these: diols, such as ethylene glycol, dipropylene glycol, triglycol, 1,2-propanediol, 1,3-propanediol, 2,2-dimethyl1,3-propanediol, 2-methyl-2-propyl-1,3-propanediol, 1,2-butanediol, 1,4-butanediol, 2-ethyl-1,4-butanediol, but-2-ene-1,4-diol, 1,2-pentanediol, 1,5-pentanediol, 3-methyl-1,5-pentanediol, 1,6-hexanediol, 2-hydroxyethyl hydroxyacetate, 2,2-dimethyl-3-hydroxypropyl-2,2-dimethylhydroxypropionate, 4,4'-methylenebiscyclohexanol and 4,4'-isopropylidenebiscyclohexanol. 2,2-dimethyl-1,3-propanediol and 3-methyl-1,5-pentanediol are some of the preferred diols.

Examples of higher-molecular components (B) are polyester polyols, polyether polyols and polycaprolactone polyols of various functionalities and molecular weights.

Polyalkylene ether polyols suitable as component (B) correspond to the general formula

in which R is hydrogen or a lower alkyl radical optionally containing various substituents, n is 2-6 and m is 3-50 or still higher. Poly(oxytetramethylene)glycols and poly(oxyethylene)glycols are examples.

Poly(oxytetramethylene)glycols of a molecular weight in the range of 350-1000 are the preferred polyalkylene ether polyols.

Polyester polyols can likewise be employed as components (B). The polyester polyols can be prepared by polyesterifying organic polycarboxylic acids or their anhydrides with organic polyols containing primary hydroxyl groups. The polycarboxylic acids and the polyols are normally aliphatic or aromatic dicarboxylic acids and diols.

The diols used for the preparation of the polyesters include alkylene glycols such as ethylene glycol, butylene glycol, neopentyl glycol and other glycols such as cyclohexanedimethanol The acid component of the polyester consists primarily of low-molecular carboxylic acids or their anhydrides having 2-18 carbon atoms in the molecule. Examples of suitable acids are phthalic acid, isophthalic acid, terephthalic acid, tetrahydrophthalic acid, hexahydrophthalic acid, adipic acid, azelaic acid, sebacic acid and glutaric acid. Anhydrides of these acids, in so far as they exist, can be used instead of the acids.

In addition, polyester polyols derived from lactones can also be used as component (B). These products are obtained by reacting an ε-caorolactone with a polyol. Such products are described in U.S. Pat. No. 3,169,945.

The polylactone polyols obtained by this reaction are distinguished by the presence of a terminal hydroxyl group and by recurring polyester moieties which are derived from the lactone. These recurring molecular moieties can correspond to the formula

in which n is not less than 4, preferably 4-6, and the substituent is hydrogen, an alkyl radical, a cycloalkyl radical or an alkoxy radical.

In principle all compounds containing one or more basic nitrogen atoms can be employed as basic amine catalysts.

Tertiary amines, such as for example N,N-dimethylbenzylamine, tributylamine, dimethylcyclohexylamine and dimethyl-$C_{12}/C_{14}$-amine ($C_{12}/C_{14}$ represents an aliphatic chain containing 12-14 carbon atoms) are preferably used.

The basic amine catalyst is usually used in an amount of 0.1 - 2% by weight based on the intermediate resulting from the components (A) and (B).

In contrast to the state of the art, in the process according to the invention for the preparation of electrocoating baths according to the invention the basic amine catalyst which catalyzes the reaction between the components (A) and () is neutralized, prior to further reaction of the intermediates formed from the components (A) and (B), with a Brönsted acid.

The neutralization of the basic amine catalyst can be carried out prior to the reaction of the components (A) and (B) or during the reaction between the components (A) and (B).

In one embodiment of the invention, the basic amine catalyst is neutralized by the addition of a sufficient amount of a suitable Brönsted acid in the interval between the start of the reaction between the components (A) and (B) and the termination of the reaction between the components (A) and (B) and prior to further reaction of the epoxide-containing intermediates formed from the components (A) and (B). Chloride ion concentrations are thus obtained which are below those occurring in comparable electrocoating baths not according to the invention.

A particularly preferred embodiment of the invention consists in neutralizing the basic amine catalyst prior to the reaction between the components (A) and (B), i.e. the reaction between the components (A) and (B) is catalyzed by a salt formed from the Brönsted acid used for the neutralization and the basic amine catalyst. This procedure produces particularly low chloride ion contents.

As a consequence of the measures described above, the electrocoating baths prepared by the process according to the invention show a chloride ion content which is clearly below that found in comparable electrocoating baths in the preparation of which the measures according to the invention have not been carried out.

It is surprising and was in no way forseeable that electrocoating baths with a reduced chloride ion content can be prepared with the aid of the measures according to the invention.

Brönsted acids are understood to be substances which can yield protons

In the selection of the Bronsted acid to be used for the neutralization of the basic amine catalyst which catalyzes the reaction between the components (A) and (B), attention must be given to the fact that the extent to which the chloride ion concentration is reduced also depends on the strength of the acid employed.

The $pK_s$ value, measured at 20° C., of the first stage of dissociation of the acid used, should be below 3.7, preferably below 3.5 and particularly preferably below 3.1. (For definition of the $pK_s$ value see, for example, Organikum, VEB Deutscher Verlag der Wissenschaften, Berlin 1974, pp. 150 f.)

Examples of suitable Brönsted acids are benzenesulfonic acid, p-toluenesulfonic acid, o-nitrobenzoic acid, salicylic acid and phosphoric acid.

Very particularly low chloride ion concentrations can be attained by the use of salicylic acid.

1.0–1.5 equivalents of acid to 1 equivalent of basic nitrogen are preferably used.

The reaction between the components (A) and (B) is carried out at temperatures between 100° and 190° C., preferably between 115° and 185° C.

The epoxide-containing intermediates prepared from the components (A) and (B) are reacted, if appropriate, after neutralization of the basic amine catalyst, with further conventional modifiers requiring no basic amine catalysis and then with the component (C).

Primary and/or secondary amines or their salts and/or salts of tertiary amines can be used as component (C), the secondary amines being particularly preferred components (C).

The amine should preferably be a compound soluble in water. Examples of such amines are mono- and dialkylamines, such as methylamine, ethylamine, propylamine, butylamine, dimethylamine, diethylamine, dipropylamine, methylbutylamine and the like. Alkanolamines, such as for example methylethanolamine, diethanolamine and the like, are also suitable. Dialkylaminoalkylamines, such as for example dimethylaminoethylamine, diethylaminopropylamine, dimethylaminopropylamine and the like are furthermore suitable. Low-molecular amines are employed in most cases, but it is also possible to use highermolecular monoamines.

Polyamines having primary and secondary amino groups can be reacted in the form of ketimines with the epoxide groups. The ketimines are prepared from the polyamines in a known manner.

The amines can also contain still further groups, but these should not interfere with the reaction of the amine with the epoxide group and also should not cause gelling of the reaction mixture.

The charges necessary for water dilutability and electrical deposition can be generated by protonization with water-soluble acids, for example formic acid, lactic acid, or propionic acid) or by the reaction of the oxirane groups with the salts of an amine.

The salt of a tertiary amine can be employed as the salt of an amine.

The amine part of the amine/acid salt is an amine which can be unsubstituted or substituted as in the case of the hydroxylamine; these substituents should not interfere with the reaction of the amine/acid salt with the polyepoxide and the reaction mixture should not gel. Tertiary amines, such as dimethylethanolamine, triethylamine, triisopropylamine and the like are preferred amines. Example (sic) of other suitable amines are given in U.S. Pat. No. 3,839,252 in column 5, line 3, to column 7, line 42.

The reaction between amines and epoxide groupcontaining compounds often starts as soon as the reactants are mixed together. Depending on the desired course of reaction—in particular to bring the reaction to completion—it is recommended to raise the reaction temperature to 50°–150° C.

The binders prepared by the process detailed above are further processed by well-known methods to form aqueous electrocoating baths.

The electrocoating baths according to the invention can contain, for example, conventional additives, such as for example crosslinking agents, coalescing solvents, pigments, surfactants, crosslinking catalysts, antioxidants, fillers, antifoams etc.

The advantages achievable by the invention rest on the fact that electrocoating baths of the type described above can be prepared by a technically very simply realizable process, with the baths showing a lower chloride ion concentration and hence also lower corrosivity than comparable coating baths not prepared by the process according to the invention.

The invention is explained in further detail in the examples given below. All parts and percentages are by weight, unless expressly stated otherwise

EXAMPLE 1

Preparation of a binder according to German Pat. No. 3,108,073, Example 2

1093 parts of Araldite GY 2600 (epoxide equivalent eight EEW =188, epoxy resin based on bisphenol A from Ciba-Geigy), 151 parts of neopentylglycol and 4.9 parts of dimethylbenzylamine are initially placed in a reaction vessel. The temperature is raised to 131° C. and maintained at this level until an EEW of 415 is reached 398 parts of Capa 200 (see Example 4) and a further 3.8 parts of dimethylbenzylamine are then added. The temperature is maintained at 131° C. until an EEW of 1030 is reached. Subsequently 1274 parts of the crosslinking agent (see Example 4) and 112 parts of the diketimine also referred to in Example 4 as well as 86 parts of N-methylethanolamine are added and the temperature is maintained at 112° C. for 1 hour. 135 parts of phenoxypropanol and 40 parts of methoxypropanol are then mixed in and mixing is continued for 15 minutes This resin solution is dispersed in 3247 parts of water, 23.5 parts of glacial acetic acid and 21 parts of emulsifier mixture (see Example 4).

The low-boiling solvent is subsequently removed in vacuo and a solids content of 35% is obtained.

The chloride content of this dispersion determined by argentometry is about 127 ppm of chloride.

EXAMPLE 2

Example 1 is repeated but 45 minutes prior to reaching the EEW of 1030, 12.5 parts of salicylic acid are added. The reaction is then terminated as described above.

The chloride determination by argentometry indicates for this dispersion a value of less than 80 ppm of chloride.

EXAMPLE 3

Example 1 is repeated, but, for the purposes of catalysis, the salt obtained from 4.9 parts of dimethylbenzylamine and 5.3 parts of salicylic acid is initially taken immediately together with the epoxy resin and the neopentyl glycol. Equally, the salt obtained from 3.8 parts of dimethylbenzylamine and 4.1 parts of salicylic acid is added instead of the 3.8 parts of dimethylbenzylamine to catalyze the incorporation of Capa 200.

The chloride determination by argentometry indicates for these dispersions a value of less than 55 ppm of chloride.

EXAMPLE 4

Preparation of a binder in accordance with EP No. 70,550, Example B

|  | Initial weight (g) |
| --- | --- |
| Epikote 829[1] | 727.6 |
| Capa 200[2] | 268.4 |
| Xylene | 36.1 |
| Bisphenol A | 197.8 |
| Dimethylbenzylamine | 3.8 |
| Isocyanate crosslinking agent[3] | 901.3 |
| Diketimine from MIBK and 75% diethylenetriamine in MIBK | 73.4 |
| N-methylethanolamine | 59.1 |
| Hexylglycol | 76.5 |
| Acetic acid | 33.5 |
| Emulsifier mixture[4] | 29.4 |
| Deionized water | 1793.1 |

[1]Epoxy resin from Shell Chemie, epoxy equivalent 188
[2]Polyester diol from Interox Chemical
[3]Isocyanate crosslinking agent based on toluylene diisocyanate blocked with butylglycol and reacted with trimethylolpropane in the ratio 3:1, dissolved in a mixture of MIBK and n-butanol (9:1) to give 70% of solid.
[4]Emulsifier mixture based on 120 parts of Geigy Amine C (Geigy Industrial Chemicals), 120 parts of Surfynol 104 (Air Products and Chemicals), 120 parts of butylglycol and 221 parts of deionized water with 19 parts of glacial acetic acid.
MIBK = methyl isobutyl ketone

Procedure

Epikote 829, Capa 200 and xylene are initially placed in a reaction vessel and heated to 210° C. under nitrogen as protective gas. Water is then eliminated in the course of half an hour. The reaction mixture is then cooled to 150° C., and bisphenol A and 1.6 parts of dimethylbenzylamine are added. The mixture is then heated to 180° C. and this temperature is maintained for half an hour. The reaction mixture is then cooled to 130° C. and the remainder of the dimethylbenzylamine is added. The temperature is then maintained for 2.5 hours, the isocyanate crosslinking agent, the diketimine and N-methylethanolamine are then added and the temperature is kept at 110° C. for half an hour. The hexyl glycol is then added. The reaction mixture is then dispersed in the deionized water containing glacial acetic acid and emulsifier mixture. The reaction vessel is subsequently connected to a vacuum in order to remove the highly volatile organic solvents. A solids content of 36% is obtained.

The chloride content of this dispersion is determined by argentometry. It is about 63 ppm of chloride.

EXAMPLE 5

(comparison example)

Example 1 is repeated, but 4.8 g of glacial acetic acid are added to the reaction mixture half an hour before the addition of the crosslinking agent. The subsequent procedure is then as described above.

The chloride determination of this dispersion by argentometry gives a value of 63 ppm of chloride.

We claim:

1. An aqueous electrocoating bath for cathodic paint deposition which contains, as a cathodically depositable binder, a modified epoxide-amine adduct and is prepared by reacting, in the presence of a basic amine catalyst,
(A) a polyepoxide with
(B) a compound which contains one or more hydroxyl groups per molecule bonded to an aromatic or (cyclo)aliphatic molecular fragment,
the reaction of (A) and (B) forming an epoxide group-containing intermediate, and by further reacting said intermediate with
(C) one or more amines or amine salts selected from the group consisting of primary (poly)amines, secondary (poly)amines, salts of said amines and salts of tertiary amines,
the resultant product being neutralized with acid, dispersed in an aqueous medium and processed to form an electrocoating bath, wherein said basic amine catalyst is neutralized prior to said further reaction of said intermediate, with a Brönsted acid having $pK_s$ value of the first stage of dissociation, measured at 20° C., below 3.7.

2. An aqueous electrocoating bath as described in claim 1 wherein said basic amine catalyst, which catalyzes the reaction between components (A) and (B), is neutralized by said Brönsted acid prior to the reaction between said components (A) and (B).

3. An aqueous electrocoating bath as described in claim 1 or 2 wherein said Brönsted acid has a $pK_s$ value, measured at 20° C., which is less than 3.1.

4. An aqueous electrocoating bath as described in claim 1 or 2 wherein salicylic acid is used as said Brönsted acid.

5. A process for the preparation of an aqueous electrocoating bath for cathodic paint deposition, comprising: reacting
(A) a polyepoxide, in the presence of a basic amine catalyst, with
(B) a compound which contains one or more hydroxyl groups per molecule bonded to an aromatic or (cyclo)aliphatic molecular fragment, to form an epoxide group-containing intermediate and reacting said intermediate with
(C) one or more amines or amine salts selected from the group consisting of primary (poly)amines, secondary (poly)amines, salts of said amines and salts of tertiary amines,
the resulting reaction product being neutralized with acid, dispersed in an aqueous medium and processed to form an electrocoating bath, and wherein said basic amine catalyst which catalyzes the reaction between said components (A) and (B) is neutralized prior to further reaction of said intermediate, with a Brönsted acid having a pK$_s$ value of the first stage of dissociation, measured at 20° C., below 3.7.

6. A process as described in claim 5 wherein said basic amine catalyst, which catalyzes the reaction between components (A) and (B), is neutralized by said Brönsted acid prior to the reaction between said components (A) and (B).

7. A process as claimed in claims 5 or 6 wherein said Brönsted acid has a pK$_s$ value, measured at 20° C., which is less than 3.1.

8. A process as claimed in claim 5 or 6 wherein salicylic acid is used as said Brönsted acid.

* * * * *